US012783981B1

(12) United States Patent
Badam et al.

(10) Patent No.: US 12,783,981 B1

(45) Date of Patent: Nov. 3, 2026

(54) SYSTEM AND METHOD FOR API-DRIVEN ACTION PLAN GENERATION AND EXECUTION

(71) Applicant: Adopt AI Inc., San Jose, CA (US)

(72) Inventors: Anirudh Badam, Issaquah, WA (US); Vijay Sagar Gullapalli, Campbell, CA (US); Gajanan Vishnu Sabhahit, San Jose, CA (US); Pratyush Kumar Behera, San Jose, CA (US); Deepak Anchala, San Jose, CA (US); Rahul Bhattacharya, San Jose, CA (US)

(73) Assignee: ADOPT AI INC., San Jose, CA (US)

( * ) Notice: Subject to any disclaimer, the term of this patent is extended or adjusted under 35 U.S.C. 154(b) by 0 days.

(21) Appl. No.: 19/250,608

(22) Filed: Jun. 26, 2025

(51) Int. Cl.
*G06Q 10/0631* (2023.01)
*G06F 9/54* (2006.01)
*G06F 21/53* (2013.01)

(52) U.S. Cl.
CPC ....... *G06Q 10/06316* (2013.01); *G06F 9/547* (2013.01); *G06F 21/53* (2013.01)

(58) Field of Classification Search
CPC .... G06Q 10/06316; G06F 9/547; G06F 21/53
See application file for complete search history.

(56) References Cited

U.S. PATENT DOCUMENTS 12,393,577 B2 * 8/2025 Weik .................. G06F 16/3347
2018/0152456 A1 * 5/2018 Chasman ............ G06F 21/6218
2024/0095463 A1 * 3/2024 Leary ...................... G06F 40/20
2024/0296177 A1 9/2024 Gardner et al.
2025/0013437 A1 * 1/2025 Vidan ........................ G06F 8/33
2025/0272544 A1 * 8/2025 Zhuang ................ G06N 3/0455
2025/0285055 A1 * 9/2025 Tan .................. G06Q 10/06316
2025/0348360 A1 * 11/2025 Abadi ................... G06F 9/5027

FOREIGN PATENT DOCUMENTS

CN 118426632 A 8/2024
KR 102707512 B1 9/2024

OTHER PUBLICATIONS

Wang, Lu, et al. "Large action models: From inception to implementation." arXiv preprint arXiv:2412.10047 (2024). (Year: 2024).*
Crasto, Keane Scouton, and A. Priyadharshini. "Toward Human-Level Task Automation with Large Action Models." International Conference on Soft Computing and its Engineering Applications. Cham: Springer Nature Switzerland, Apr. 11, 2025. (Year: 2025).*

* cited by examiner

*Primary Examiner* — Joanne G Macasiano

(74) *Attorney, Agent, or Firm* — Jason Smith; Shumaker, Loop & Kendrick, LLP

(57) ABSTRACT

A system for executing user requests in an application. The system receives a user request to execute two or more operations in the application. Further, the system utilizes a first Large Language Model (LLM) to generate an action plan comprising a sequence of performing a set of action workflows, one or more API calls, and one or more data handling operations. The one more data handling operation comprises one or more of join, filter, and scatter-gather. The first LLM is fine-tuned based on action workflows of the application and an application specification and executes the action plan in real-time when no issues are identified in the action plan, wherein the action plan is executed by interfacing with backend systems of the application, APIs, and databases.

20 Claims, 7 Drawing Sheets

SYSTEM AND METHOD FOR API-DRIVEN ACTION PLAN GENERATION AND EXECUTION

FIELD OF INVENTION

The present disclosure relates to systems and methods for executing user requests in applications, and more particularly to a system and method for generating and executing API-driven action plans using large language models.

BACKGROUND

Large language models (LLMs) have demonstrated remarkable capabilities in natural language processing and generation tasks. However, leveraging LLMs to execute complex operations in software applications presents technical challenges. Existing approaches often struggle to reliably translate natural language user requests into precise sequences of API calls and data handling operations.

Current solutions typically involve hard-coding predefined workflows or using simple pattern matching to map user inputs to API calls. These methods lack flexibility and struggle with nuanced or multi-step requests. Additionally, they frequently fail to handle edge cases or unexpected inputs gracefully.

Some systems attempt to use LLMs to generate API calls directly, but this can lead to inconsistencies, invalid operations, or mismatches with the application's capabilities. There is also a risk of hallucinated or nonsensical API calls that do not align with the actual application specification.

Furthermore, existing implementations often have difficulty combining multiple API calls and data processing steps into coherent workflows. They fail to properly sequence operations and struggle with more complex data operations.

Existing methods for generating API-driven workflows face significant limitations when dealing with large API sets. These approaches often struggle to effectively navigate and utilize extensive collections of APIs, leading to suboptimal or incomplete action plans. Additionally, many current systems lack a mechanism for users to review and validate the proposed steps before execution, potentially resulting in unintended actions or outcomes. This lack of user oversight can be particularly problematic in complex or sensitive operations. Moreover, these methods frequently fail to handle unforeseen scenarios or mismatches between user input and API requirements. For instance, if a user provides a "Department Name" when the API specifically requires a "Department ID," the system may fail to execute the intended action or produce erroneous results. Such rigid input requirements and lack of intelligent data transformation capabilities significantly limit the flexibility and reliability of these systems in real-world applications.

Another limitation of current approaches is the inability to adapt to changes in the underlying application or API structure without extensive manual updates. This lack of flexibility hampers maintainability and scalability.

Lastly, many existing solutions do not adequately address compliance and security concerns when executing user-requested operations, potentially exposing sensitive data or violating domain-specific rules.

These technical challenges highlight the need for more sophisticated systems that can reliably translate natural language requests into executable action plans while maintaining accuracy, flexibility, and compliance with application-specific constraints.

SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

A system for executing user requests in an application may comprise a device having a memory and a processor running the application, and a software development kit (SDK) integrated with the application. The SDK may be stored in the memory and executed by the processor, and may interact with one or more APIs of the application. The SDK may be configured to receive a user request to execute two or more operations in the application, generate an action plan using a first Large Language Model (LLM), and execute the action plan on the application in real-time when no issues are identified.

The action plan may comprise a sequence of performing a set of action workflows, one or more API calls, and one or more data handling operations. The data handling operations may include one or more of join, filter, scatter-gather operations. The action plan further may comprise LLM-Powered Analysis, and Input Reasoning. The first LLM may be fine-tuned based on action workflows of the application and an application specification. The action plan may be executed by interfacing with backend systems of the application, APIs, and databases.

In some cases, an action workflow may map one or more APIs to a set of operations associated with the application, where the APIs may comprise documented APIs and undocumented APIs. The fine-tuning of the first LLM may involve training based on action workflows and application specifications, providing domain-specific language examples for data handling operations, and utilizing labeled examples to optimize accuracy.

The system may utilize a second LLM to verify the correctness of generated action plans by identifying inconsistencies, invalid operations, or API mismatches based on compliance norms or domain-specific rules. The second LLM may flag issues in the action plan and augment the plan by resolving identified problems during verification.

The system may provide users with predefined modification options for customizing action plans, including filtering criteria adjustments, data selection, and step reordering. Execution may occur within an isolated environment where user data is encrypted during transmission and storage to maintain privacy.

In another embodiment, A method for executing user requests in an application may comprise receiving a user request to execute two or more operations in the application, generating an action plan using a first Large Language Model (LLM), and executing the action plan on the application in real-time when no issues are identified. The method may involve generating an action plan that comprises a sequence of performing a set of action workflows, one or more API calls, and one or more data handling operations. The data handling operations may include one or more of join, filter, and scatter-gather operations. The first LLM may be fine-tuned based on action workflows of the application and an application specification.

In some cases, the method may include mapping one or more APIs to a set of operations associated with the application through action workflows, where the APIs may comprise documented APIs and undocumented APIs. The fine-tuning process may involve training the first LLM based on action workflows and application specifications, providing domain-specific language examples for data handling operations, and utilizing labeled examples to optimize the model's accuracy. The method may utilize a second LLM to verify the correctness of generated action plans by identifying inconsistencies, invalid operations, or API mismatches based on compliance norms or domain-specific rules. The second LLM may flag issues in the action plan and augment the plan by resolving identified problems during verification.

The method may involve training the first LLM based on feedback from the second LLM regarding flagged inconsistencies, invalid operations, or API mismatches to improve the accuracy of future action plans. The execution of the action plan may occur by interfacing with backend systems of the application, APIs, and databases.

The foregoing general description of the illustrative embodiments and the following detailed description thereof are merely exemplary aspects of the teachings of this disclosure and are not restrictive.

BRIEF DESCRIPTION OF FIGURES

Non-limiting and non-exhaustive examples are described with reference to the following figures.

INCORPORATION BY REFERENCE

Figure 1:
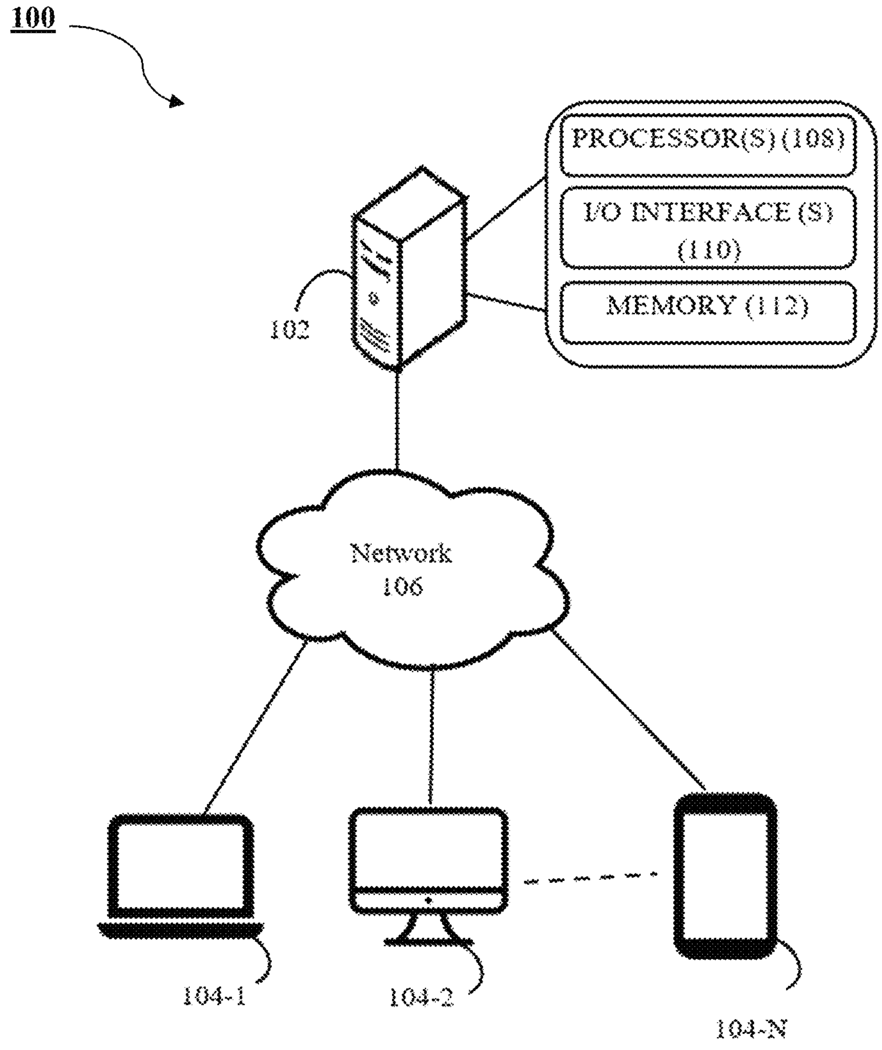
FIG. 1 illustrates a network implementation for executing user requests in an application, in accordance with an embodiment of the present subject matter.

All publications, patents, and patent applications mentioned in this specification are herein incorporated by reference to the same extent as if each individual publication, patent, or patent application was specifically and individually indicated to be incorporated by reference. U.S. patent application Ser. No. 19/175,972 titled "AI-based system and method for automated API discovery and action workflow generation" is incorporated herein by reference.

DETAILED DESCRIPTION

The following description sets forth exemplary aspects of the present disclosure. It should be recognized, however, that such description is not intended as a limitation on the scope of the present disclosure. Rather, the description also encompasses combinations and modifications to those exemplary aspects described herein.

This invention relates to systems and methods for executing user requests in software applications using large language models (LLMs) and advanced API orchestration. More specifically, it introduces a dual-LLM architecture that enables natural language inputs to be translated into structured, verifiable, and executable action plans for complex application workflows.

Traditional methods that allow language models to directly invoke APIs suffer from scalability issues, lack of transparency, and frequent failure in real-world edge cases-particularly when handling large API sets or interpreting ambiguous user inputs. These systems typically execute actions without offering users a way to preview, modify, or validate the underlying logic, resulting in unpredictable outcomes and poor reliability.

The present system disclosed herein teaches a first LLM that generates an intermediate action plan based on user request. The action plan consists of sequenced API calls, data-handling operations such as joins, filters, and scatter-gather logic, and aligns with both documented and undocumented application workflows. A second LLM then validates this action plan by checking for inconsistencies, compliance violations, or invalid operations. If any issues are detected, the second LLM augments the plan to ensure correctness before execution.

The inclusion of this intermediate planning step introduces a crucial layer of interpretability, extensibility, and safety. It not only improves the accuracy of the system in satisfying complex user requests but also enables richer logic than what the underlying APIs alone can offer. Furthermore, the system continuously improves itself-leveraging user modifications and feedback to fine-tune the first LLM through supervised learning and reinforcement mechanisms guided by the second LLM.

The system is suited for enterprise software platforms, low-code/no-code builders, AI copilots, and automation tools that require reliable, explainable, and adaptive execution of multi-step operations. It unlocks a new paradigm for human-AI interaction by merging natural language understanding with structured execution logic, while maintaining user oversight and data integrity.

Referring now to FIG. 1, a network implementation 100 of a system 102 for generating, verifying, and executing action plans in response to user requests within an application is disclosed. The system 102 may include a software development kit (SDK) installed within an application running on a user device 104-1. A plurality of user devices 104-1, 104-2 . . . 104-N (collectively referred to as user devices 104) may access the system 102 via applications or interfaces residing on the devices. In operation, the SDK receives a natural language input from the user and initiates a multi-stage process involving a first large language model (LLM) and a second LLM. The first LLM generates an action plan comprising a sequence of API calls and data-handling operations (e.g., join, filter, scatter-gather), which is then validated by the second LLM for correctness, compliance, and feasibility before execution.

Although the present disclosure describes system 102 as being implemented on a server, it may equally be deployed in diverse computing environments such as cloud-based systems, virtual machines, laptops, workstations, or distributed networks. In one embodiment, system 102 comprises a cloud-native SDK component that allows multiple user devices 104 to send requests and receive real-time responses. Examples of user devices 104 include mobile phones, tablets, laptops, personal computers, or smart devices that communicate with the backend SDK using APIs over a network 106.

In one embodiment, the network 106 may include wireless and/or wired infrastructure and may be implemented as any combination of Internet, intranet, LAN, WAN, or enterprise network protocols. The network 106 may further comprise standard communication interfaces and protocols, including but not limited to HTTP, HTTPS, WebSockets, TCP/IP, and RESTful API endpoints. Network 106 enables seamless communication between the user-facing application and the backend systems, including access to application-specific APIs and data services.

In one implementation, system 102 comprises at least one processor 108, an input/output (I/O) interface 110, and a memory 112. The processor 108 may include CPUs, GPUs, or AI accelerators capable of executing inference operations for large language models. It is configured to fetch, interpret, and execute instructions stored in the memory 112 and to coordinate the functioning of the SDK, the LLMs, and the API interface.

The I/O interface 110 may include graphical or conversational interfaces for capturing user intent and relaying output. It may also interface with external APIs, application workflows, and internal components of the system. In one embodiment, the I/O interface 110 acts as a gateway through which user requests are received, and corresponding action plans are returned, enabling bi-directional communication between the SDK and external systems such as databases, compliance engines, or third-party APIs.

The memory 112 stores application specifications, API definitions, compliance rules, and the machine learning models (i.e., the first and second LLMs). It may include volatile and non-volatile storage media such as DRAM, flash storage, SSDs, or object storage. The memory 112 holds training datasets, action plan templates, validation rules, user feedback logs, and historical execution traces. In some implementations, it also stores learned correction patterns used to retrain the first LLM based on augmentations performed by the second LLM.

Given the increasing complexity of software applications and the limitations of direct API calling through traditional language models, there is a need for system 102 to mediate between user intent and actual execution using an intermediate action plan. A user interacts with the system through device 104 to submit a request (e.g., "fetch employee payroll data for the last 2 years"). The first LLM generates the action plan, the second LLM verifies or augments it if necessary, and the plan is then executed on application backend systems using verified API calls. The functioning of the system is described in greater detail with reference to figures provided in this disclosure.

The system may comprise a software development kit (SDK) integrated with an application running on a device. The device may include, but is not limited to, a mobile phone, tablet, desktop computer, or embedded system configured to execute the application. In one embodiment, the SDK resides in the memory of the device and is executed by a processor associated with the device. The SDK may be responsible for capturing, interpreting, and routing user requests issued within the context of the application. These requests may be entered via graphical user interfaces, command-line inputs, natural language prompts, or voice-based interactions, depending on the modality supported by the application.

The SDK may be configured to interact with one or more application programming interfaces (APIs) associated with the application. These APIs may include documented APIs exposed via the frontend or backend systems of the application, as well as undocumented or internal APIs accessible through direct calls to backend services or microservices. The SDK may retrieve metadata associated with these APIs, including expected input parameters, output formats, authentication requirements, rate limits, or compliance constraints. This API interaction capability enables the SDK to serve as a bridge between the user's high-level intent and the lower-level technical operations exposed by the application infrastructure.

Upon receiving a user request, the SDK may parse the input and extract relevant information such as entities, intents, operations, filters, and target data attributes. These requests may pertain to single-step actions (e.g., "fetch my leave balance") or more complex multi-step queries (e.g., "list employees in the Marketing department who received bonuses above $5,000 in the last two years"). The SDK may also handle even more intricate multi-step tasks (e.g., "Create a new project called 'Follow up with customer Acme™ Coffee Shop'. Add a task to the project called 'Setup Initial Meeting with customer leadership'. Assign the task to John Doe. Set the task status to 'In Progress'"). This complex action requires several elements to work in concert, where each step is dependent on the successful execution of the previous one. For example, the first action-creating a project with a specific name-must execute and save the result, such as a project ID, into intermediate storage. This ID can then be retrieved by the subsequent action, which creates a task in the previously created project using the stored project ID.

The SDK may maintain a context model for each active session or request, allowing it to resolve ambiguous terms (e.g., converting "Marketing department" into a department_id), map synonyms, and handle variations in natural language expressions. In this case, the context model also tracks intermediate results between actions, ensuring that the state of the workflow is preserved and can be referenced as needed for downstream tasks. The SDK may also identify references to structured fields or identifiers required for downstream processing, such as employee IDs, dates, salary ranges, or performance metrics. This intermediate storage, which holds key data like project IDs or task statuses, is critical to executing multi-step operations. It serves as a dynamic repository of context-specific information that can be used to maintain the continuity of complex workflows, making the SDK capable of orchestrating a sequence of actions where the output of one step directly informs the next. This intermediate storage—referred to as the context model—functions as an operational component in the system, akin to other operations such as filter, select, or scatter-gather, enabling the system to manage and manipulate data effectively across multiple steps.

The SDK may further access stored application specifications, schemas, or workflow definitions, which describe how different operations and data entities are interconnected. This contextual information allows the SDK to normalize incoming user requests and determine the operational boundaries within which the request can be fulfilled. In some embodiments, the SDK may include predefined rules for validating the user request, such as checking for missing parameters, detecting incompatible query filters, or flagging requests that involve restricted data fields. This ensures that the request is well-formed and meets the prerequisites for downstream interpretation.

In addition to user-initiated requests, the SDK may also receive auxiliary data such as user preferences, role-based access controls, and application state variables (e.g., active user session, data visibility scope, or UI context). These inputs may influence how the system interprets and responds to a request. For example, two users requesting the same information may receive different outputs based on their roles or access levels. The SDK may use this information to tailor the request processing logic in accordance with privacy policies, business rules, or compliance requirements.

Once a user request is received and contextualized by the SDK, the system may invoke a first large language model (LLM) to generate an action plan corresponding to the user request. The first LLM may be a transformer-based neural network model that has been fine-tuned using application-specific data, including API specifications, application workflows, historical user queries, and domain-specific language patterns. The model may operate in a sequence-to-sequence or instruction-following mode, wherein it receives the normalized user input and outputs a structured representation of the steps required to fulfill the request.

The action plan generated by the first LLM may comprise a sequence of steps, each step representing a discrete operation necessary to complete the requested task. These steps may include a combination of action workflows, API calls, and data handling operations. The action plan may be represented in a structured format, such as JSON, XML, or a domain-specific intermediate representation that can be interpreted by the SDK or execution layer.

Action workflows within the action plan may define higher-level functional units that encapsulate one or more API calls. Each action workflow may correspond to a specific operation associated with the application (e.g., retrieving employee records, updating payroll entries, or fetching compliance flags). These workflows may be defined as reusable modules within the application and may be parameterized based on the context of the user request. The first LLM may be trained to identify the appropriate action workflows based on the semantics of the input and the relationships between entities within the application specification.

The API calls referenced in the action plan may include both documented APIs (e.g., GET/employees, POST/bonuses) and undocumented or internal APIs exposed through backend service layers. Each API call step may include metadata such as the endpoint, required parameters, authentication tokens, query filters, expected response structure, and any error-handling instructions. The first LLM may map entities from the user request (e.g., "Marketing department") to the required parameter values (e.g., department_id=204) using internal dictionaries, ontologies, or real-time lookups performed by the SDK.

The action plan may further include data handling operations that define how to manipulate, combine, or filter the output from multiple API calls. These operations may include, but are not limited to:

Join: Combining records from two or more API responses based on a shared key (e.g., joining employee data with performance ratings).

Filter: Selecting records that meet specific criteria (e.g., bonuses greater than $5,000 within the last 2 years).

Scatter-Gather: Executing a set of API calls in parallel (e.g., fetching reportees for each manager) and aggregating the results.

LLM-Powered Analysis: Analyzing data using Large Language Models (LLMs) to generate insights beyond simple data retrieval. This includes identifying expensive transactions, analyzing the reasons for their cost, suggesting whether transactions should be cancelled, or highlighting which transactions provide the most value for money.

Input Requesting: Prompting users for specific inputs via forms or interactive elements to customize the action plan and further refine the data being processed (e.g., asking the user for a date range or specific criteria to filter transactions).

These data operations enable the system to go beyond simple API chaining and implement complex, multi-step workflows that mimic real-world business logic. The inclusion of join, filter, and scatter-gather primitives allows the system to support powerful analytical queries, conditional branching, and hierarchical data retrieval patterns, all derived from a single user request. The ability of the first LLM to reason through such constructs and generate a coherent, executable plan forms the core innovation of this system.

The first large language model (LLM) may be trained using a multi-phase methodology designed to align the model's outputs with the structure, semantics, and constraints of application-specific workflows. The training process may begin with data collection and preprocessing, where a diverse corpus of user request examples is assembled. These examples may include simple commands (e.g., "get my timesheet for last week") and more complex requests involving multiple operations (e.g., "list all employees in Finance who joined after 2020 and earned bonuses over $10,000"). Each user request in the dataset is paired with a corresponding ground-truth action plan, which serves as the target output during supervised learning.

The raw user inputs may be tokenized and normalized, and natural language entities (such as department names, date references, or employee titles) may be annotated or enriched with structured tags. Additionally, the API schema, documented workflows, and application specifications may be encoded into vectorized formats or prompt templates and fed into the model to provide contextual grounding. Entity recognition and slot-filling mechanisms may be incorporated during preprocessing to highlight critical elements such as API parameters, operation types, and conditional logic.

The model architecture for the first LLM may be based on a transformer design capable of capturing long-range dependencies, contextual relationships, and hierarchical intent structures. Attention mechanisms may be employed to focus on relevant parts of the user request while generating each step of the action plan. For example, when generating a filter operation based on a bonus threshold, the model may attend to both the numerical value and the time constraint expressed in the input. Fine-tuning may be performed by selecting an appropriate method such as LoRA (Low-Rank Adaptation) or DPO (Differentiable Prompt Optimization) to optimize the model's performance. Instead of using a traditional loss function, fine-tuning adjusts the model's parameters to improve its ability to generate accurate and contextually relevant action plans.

Fine tuning may of the model may be performed by providing training data with variations in phrasing, synonyms, and nested query patterns to improve generalization across different user expressions. The model is fine-tuned on labeled examples, using a combination of positive and negative examples to reinforce correct behavior and avoid common errors. This fine-tuning is guided by methods such as LoRA or DPO, which fine-tune the model in a way that improves its language generation capacity for real-world queries without requiring a loss function.

After initial fine tuning, the first LLM may be fine-tuned using domain-specific datasets tailored to the application's operating environment. These datasets may include custom API definitions, business rule templates, and common user scenarios observed in production. During this phase, the model may be exposed to simulated execution traces or partial plan validations to reinforce alignment with executable output formats. This ensures that the model's action plans are not only accurate in terms of language but also feasible when executed.

Optionally, reinforcement learning techniques may be employed to further improve the model's ability to generate high-quality plans. In such cases, a reward function may be defined based on successful execution of the plan, validation by a second LLM, or positive user feedback. The model may iteratively generate action plans, receive reward signals, and adjust its internal parameters to maximize expected plan accuracy and completeness. The feedback loop continuously tunes the labeled examples, ensuring that successful actions are reinforced, and failures are avoided.

Additionally, the system may maintain a continuous learning loop, wherein action plans corrected or augmented by the second LLM are stored as labeled examples. These correction logs may be periodically curated and added to the fine-tuning dataset, enabling the first LLM to avoid repeating common errors and to evolve alongside changes in API schemas, compliance requirements, and user behavior.

The second LLM runs the workflow generated by the first LLM in a step-by-step manner, similar to a debugger running on a conventional program. It ensures that a workflow, such as "Fetch all payroll records," actually produces the correct output. For example, the second LLM might run the workflow and then state, "We were designing a workflow to fetch payroll records, but when I actually ran the workflow, I got attendance and leave records. I am going to declare the workflow creation process as failed." This process adds an extra layer of verification, ensuring that the action plan not only makes logical sense but also produces the expected results when executed.

Once the first LLM has generated an action plan corresponding to a user request, the system may initiate a verification phase involving a second large language model (LLM). The second LLM is configured to analyze the generated action plan to ensure that it aligns with the application's API specifications, domain rules, and contextual correctness. This step introduces a layer of safety, accuracy, and compliance prior to execution.

The second LLM receives the structured action plan as input, along with relevant metadata such as compliance constraints, schema definitions, and historical user feedback, if available. The second LLM is fine-tuned on application specification. The second LLM evaluates each step in the plan—including API calls, data filters, joins, and other operations—to identify possible issues. These may include, but are not limited to:

- Mismatched or missing API parameters (e.g., providing a department name where a department ID is required)
- Invalid or deprecated API endpoints
- Violations of business rules or data access policies
- Incompatible data types or schemas
- Logical inconsistencies in operation sequences (e.g., attempting to filter before data is retrieved)

In one embodiment, the second LLM performs a multi-stage reasoning process. It first parses the action plan structure to identify the sequence of operations and dependencies. Then, for each operation, it checks the input-output validity based on documented API behavior, schema expectations, and compliance rules. For instance, if a bonus filtering step is defined with a time window using an unsupported parameter (e.g., year>2022), the second LLM may flag this as invalid and recommend replacing it with a supported date range (e.g., bonus_date>="2023-01-01").

Upon identifying one or more issues, the second LLM may enter an augmentation phase where it suggests or directly applies modifications to correct the action plan. These corrections may include replacing incorrect API calls, modifying filter expressions, adjusting parameter values, or reordering steps to align with valid execution flows. The second LLM may also enrich the action plan with additional validation steps, default values, or fallback conditions to ensure robustness.

In cases where the user request references abstract or ambiguous terms, the second LLM may resolve these using internal mappings, application ontologies, or inference from prior user behavior. For example, if a user requests data "from the last two years," the second LLM may translate this into an exact date range based on the current system time.

The second LLM may also incorporate user-specific context such as access permissions, previous corrections, or profile attributes to further tailor the validation logic. If a user lacks access to certain data fields (e.g., salaries or performance reviews), the second LLM may either redact those operations from the plan or substitute them with permissible alternatives.

After verification and augmentation, the second LLM outputs a report indicating the errors in the action plan, detailing the precise steps where mistakes occurred. The first LLM then revisits the workflow and redoes the steps based on the corrections suggested by the second LLM. Once the first LLM has updated the action plan, the revised plan is semantically consistent, syntactically valid, and ready for execution. In one embodiment, the augmented plan may be logged alongside the original for training purposes, feeding into the system's continuous improvement loop. In an alternate embodiment and not by way of any limitation, after verification and augmentation, the second LLM may output a revised action plan that is semantically consistent, syntactically valid, and ready for execution. In one embodiment, the augmented plan may be logged alongside the original for training purposes, feeding into the system's continuous improvement loop.

The corrected action plan is then passed to the execution engine of the SDK, which interfaces with the appropriate backend systems, APIs, or data sources to fulfill the user's request. By separating the planning and verification phases across two independently trained models, the system achieves a high degree of fault tolerance, transparency, and maintainability in complex application environments.

The second large language model (LLM) is trained to perform verification and augmentation of action plans generated by the first LLM. Its primary objective is to detect inconsistencies, invalid API calls, logic flaws, or data schema mismatches within the action plan and propose or apply corrective modifications. To achieve this, the second LLM is trained using a multi-stage, feedback-driven process that leverages both synthetic training data and real-world user corrections.

The initial training phase of the second LLM involves supervised learning on a labeled dataset composed of action plans paired with known corrections. Each training sample may include: (i) a user request, (ii) the initial action plan generated by the first LLM, and (iii) the corresponding corrected version of the plan, annotated with the reason for each change. These reasons may include incorrect parameter formats, misused API methods, missing dependencies, out-of-order operations, or business rule violations.

During preprocessing, input action plans are tokenized and parsed into hierarchical representations that preserve the logical structure of workflows, including sequences, conditionals, joins, and data filters. The second LLM is trained to interpret these representations in conjunction with API specifications, data schemas, and rulebooks, which are encoded as structured prompts or embedded references. The model learns to identify discrepancies between the intended user request and the execution semantics of the action plan, and to output a modified plan that satisfies both user intent and technical validity.

To enhance contextual understanding, the model is also trained with metadata such as user roles, access levels, compliance constraints, and application-specific ontologies. These inputs help the model reason about permissible operations, hidden dependencies, and contextual substitutions (e.g., mapping a user-friendly label to a backend enum value). For example, if a plan references a deprecated API endpoint or lacks an authentication token, the model is trained to infer the correct endpoint or insertion point for the token.

Beyond static supervision, the second LLM is further improved through reinforcement learning from human feedback (RLHF) and execution outcomes. When users manually modify a suggested action plan or when an execution fails and a corrected plan succeeds, these examples are logged as implicit feedback. Each correction made by a user, or each verified success or failure of an action plan, may be assigned a reward or penalty score depending on its contribution to resolving a planning error. The model is then fine-tuned to maximize rewards across similar future tasks, improving its accuracy in suggesting corrections autonomously.

In some embodiments, the model is also trained to explain its corrections by generating justification annotations. For example, if a filter condition was changed from year>2022 to bonus_date>="2023-01-01", the second LLM may generate an explanation such as: "Corrected time filter to match expected date format in API schema." These annotations can be used to improve model transparency, aid debugging, and support further supervised learning by clarifying the rationale behind each transformation.

The training pipeline may be continuously updated with newly observed user requests and corrected plans, allowing the second LLM to adapt over time to changes in API design, user behavior, application policies, and business logic. As a result, the second LLM evolves from a static validator into an intelligent agent capable of collaborative planning, learning from both explicit corrections and implicit system feedback.

After the action plan has been verified and optionally augmented by the second LLM, the system proceeds to save the validated action plan in the action library, where it can be reused for future user requests. At the time of a user request, an execution engine retrieves the appropriate action plan from the library and initiates execution. As part of executing the action, the execution engine is responsible for invoking the specified API calls, performing the defined data handling operations (e.g., joins, filters, scatter-gather), and returning the aggregated output to the user interface or client application.

Prior to execution, the system may determine an appropriate execution environment from among a plurality of available environments. This determination may be made dynamically by analyzing both the user request and the data associated with the request. The analysis may include evaluating the sensitivity of the data, such as whether the data includes personally identifiable information (PII), financial records, or health-related content, as well as identifying user control preferences or privacy constraints explicitly or implicitly conveyed in the request.

For example, if the user request involves access to payroll, employee reviews, or compliance-sensitive reports, the system may classify the execution context as requiring enhanced confidentiality. Similarly, if the request indicates that the user wishes to retain full control of data access or if organization-level policy tags are attached to the request, the system may apply stricter execution rules.

Based on this analysis, the system selects a secure execution environment for carrying out the action plan. The secure execution environment may include one of:

- a private cloud infrastructure, isolated from public networks and controlled within the organization's security perimeter; or
- a runtime environment embedded within or accessible through the SDK, which enforces strict access controls, encrypted data transmission, and audit logging.

Additionally, organizations may require ensuring that the LLM provider is trusted and does not use proprietary data to train their models. For highly sensitive workloads, a private self-hosted LLM deployment infrastructure (e.g., running Meta's™ LLaMA models on a GPU in a private cloud) may be preferred over relying on public LLM providers such as OpenAI™ or AWS™. This ensures that sensitive data remains within the organization's control and is not exposed to third-party LLM providers.

Once the secure environment is determined, the system may initialize a runtime session within that environment, load the action plan, and begin execution. Each step in the action plan is executed in sequence or in parallel as dictated by the plan structure. API calls are made using authenticated and authorized credentials, and responses are processed in accordance with the data handling logic defined in the plan.

The processor executing the plan may also handle retries, error recovery, rate-limit management, and secure caching where applicable. Intermediate data generated during execution may be encrypted at rest and in transit, using cryptographic protocols (e.g., AES-256, TLS 1.3). Execution logs, errors, and outcomes may be stored in a secure, access-controlled logging system to ensure traceability and compliance with audit requirements.

Upon completion of the action plan, the final result set is formatted and returned to the requesting user device, application interface, or downstream workflow as applicable. The system may optionally provide a plan summary, validation status, and a reference token for future reuse or auditing of the execution instance.

This execution architecture ensures that each user request is fulfilled not only accurately and efficiently, but also in alignment with enterprise-grade data security, user control, and compliance requirements.

Following the execution of the action plan, the system may initiate a feedback integration process to support continuous learning and ongoing improvement of both the first and second large language models (LLMs). This process allows the system to evolve and adapt based on real-world usage patterns, user corrections, execution success or failure, and observed mismatches between intended outcomes and actual results.

In one embodiment, the system monitors the execution trace for each action plan and records a variety of execution metadata. This may include:

whether the execution succeeded or failed, the response times and error codes for each API call, whether the output satisfied the user request (e.g., via a success acknowledgment or rating), and any manual modifications made by the user to the generated plan before execution.

These observations are stored in a structured feedback log and may be linked to the original user request, the pre- and post-verification versions of the action plan, and the context under which the request was issued.

When the user edits the action plan (e.g., to adjust a filter, fix a parameter, or change the order of steps), these manual changes are recorded as correction examples. Similarly, if a plan is auto-corrected by the second LLM and the resulting execution succeeds, the system may treat the second LLM's correction as a successful intervention. These examples are labeled and fed back into the training pipelines of the respective models.

The first LLM may be retrained or fine-tuned using corrected or validated action plans as new supervision data. These additional training examples help the model avoid repeating common mistakes, such as selecting deprecated APIs, mismatching parameter formats, or omitting necessary steps. Over time, this enables the first LLM to improve its initial action plan generation accuracy, reducing the need for intervention by the second LLM.

The second LLM may also be updated using instances where its corrections led to successful execution or where its suggestions were rejected or overridden by the user. In this manner, the second LLM refines its ability to detect errors, propose fixes, and handle edge cases effectively. Reinforcement learning techniques may be applied by assigning rewards for corrections that lead to valid, executable plans and penalties for ineffective or unnecessary changes.

In addition to improving accuracy, the feedback integration loop may also support personalization and domain adaptation. For example, frequent users may express consistent preferences in how plans are structured, what data they prioritize, or which workflows they frequently trigger. The system may learn these preferences implicitly through usage data or explicitly through configuration settings, and use them to bias future plan generation and verification in favor of user-specific patterns.

To preserve the integrity and privacy of user data, the system may employ differential privacy techniques or anonymized aggregation when incorporating user feedback into retraining datasets. Training updates may be performed periodically (e.g., nightly or weekly) and may be deployed incrementally using continuous integration pipelines to avoid regression or performance degradation.

Through this feedback-driven architecture, the invention enables both LLMs to evolve from static, pre-trained models into continuously learning agents that adapt to changing APIs, application logic, compliance requirements, and user behaviors-delivering sustained accuracy, contextual relevance, and system robustness over time.

Consider an example, a user issues a natural language request through an application interface: "Show me all employees in the Marketing department who received bonuses greater than $5,000 in the last 2 years, along with their performance rating and the names of their direct reports." The request is received by an Action Executor, which consists of LLMs within an SDK operating on the user device. A first LLM parses the input and extracts key elements, including the department reference ("Marketing"), bonus threshold (">$5,000"), time range ("last 2 years"), and additional data fields ("performance rating" and "direct reports"). These elements are normalized and contextualized using application metadata, such as mapping the "Marketing" department to an internal department_id, and recognizing that "last 2 years" refers to a rolling time window based on the current system date.

The normalized input is passed to the first LLM, which generates an action plan comprising a sequenced workflow. The plan includes: (i) retrieving the department_id for "Marketing"; (ii) querying the employees API for records associated with that department; (iii) fetching bonus records for each employee and filtering those with amounts greater than $5,000 within the specified date range; (iv) retrieving performance ratings for the filtered employee set; and (v) using a scatter-gather operation to obtain the list of direct reports for each matched employee via the reportees API. The action plan further includes data handling operations such as filtering, joining across API responses, and parallelized calls to optimize latency. The Action Executor selects the appropriate action to run and passes the action identifier along with the extracted key elements to the Execution Engine for execution. Before execution, the action plan is passed to the second LLM for validation. The second LLM inspects each step and detects that the original filter condition in the bonus query (year>2022) is syntactically invalid in the API specification. It replaces this with a compliant filter using ISO date format (e.g., bonus_date>="2023-01-01"). It also verifies that the department reference has been correctly mapped to a valid identifier and confirms that the reportees API accepts manager_id as an input. The second LLM makes these corrections and produces an augmented version of the action plan.

Next, the system analyzes the sensitivity of the data being accessed, including salary-related bonuses and performance reviews. Based on this assessment, and the user's organization-level privacy preferences, the system determines that the action plan must be executed within a secure environment. A secure execution environment is selected from the available infrastructure options, specifically a private cloud instance that supports encrypted computation and audit-logging. The action plan is then executed step-by-step by a processor operating within the secure runtime, invoking the necessary APIs and assembling the final result set.

Upon successful execution, the result is returned to the user via the SDK interface, including employee names, their respective bonuses and ratings, and a nested list of their direct reports. Additionally, all execution traces, corrections made by the second LLM during action design time, and response times are logged as part of the system's feedback loop. These are stored securely and may be used to further fine-tune the first LLM, ensuring that future action plans for similar requests are more accurate and require fewer interventions. The second LLM is only involved during the action design phase, where it verifies, validates, and tests the generated action plan to ensure correctness and alignment with the application's rules. It is not involved at user request time, as its role is to improve the action plan before execution. This example demonstrates how the invention handles complex, multi-entity queries in a secure, verifiable, and continuously improving manner.

Consider another example, the user requests-"Generate a report of all employees who accessed confidential project files in the last 90 days and have not completed mandatory compliance training." In this scenario, a compliance officer accesses the enterprise application and enters the above query through the application interface. The SDK embedded within the application receives the user request and parses it to identify key entities:

Resource accessed: confidential project files

Time constraint: last 90 days

Compliance condition: incomplete training

The SDK also captures metadata about the user's role (e.g., compliance officer), the context (e.g., audit mode), and relevant access policies that apply to the request. The normalized query is forwarded to the first LLM, which generates a structured action plan composed of sequenced API calls and data operations. The following table summarizes the action plan:

Action Plan Structure

| Step | Description | API/Operation | Notes |
|---|---|---|---|
| 1 | Retrieve list of files classified as "confidential project files" | GET /files?classification=confidential&category=project | Returns file IDs |
| 2 | Get access logs for those file IDs within the last 90 days | GET /access_logs?file_ids=[ ... ] &timestamp>=Today-90d | Returns employee IDs with access timestamps |
| 3 | Retrieve compliance training status of accessed employees | GET /training_status?employee ids=[ ... ] | Returns training records |
| 4 | Filter employees with training_status != 'Completed' | Filter operation | Eliminates compliant users |
| 5 | Join data to generate report with employee name, accessed files, and last training date | Join operation | Structured response output |

The second LLM is invoked to validate the generated action plan. It identifies that the access log query is missing a role restriction, which is a mandatory parameter in the organization's compliance policies. It also detects a mismatch between the file classification tag and the current backend schema, where the field is labeled as confidentiality_level. The second LLM augments the plan by:

Replacing classification=confidential with confidentiality_level=high

Appending role_filter=compliance_viewer to the access log query

These corrections ensure the action plan adheres to both the API specification and enterprise compliance standards.

The system then evaluates the sensitivity of the data—since it includes both employee access logs and training status, which are governed under internal audit policy—and selects a secure execution environment. The execution is routed to a dedicated compliance runtime within a private cloud, ensuring encrypted storage, access-logged API calls, and immutability of audit records.

Once the action plan is executed in the secure environment, the final report is generated and made available to the user through a controlled access link with audit metadata. This may include the number of employees matched, the date range of the query, and verification that the user had appropriate authorization.

The result and any corrections made to the original plan are logged. These are used in subsequent training cycles of the first and second LLMs. For instance, the correction involving classification vs. confidentiality_level may be added to the supervised dataset to help the first LLM avoid similar issues in future requests.

The disclosed user interface is not merely a passive display of information, but an active, interactive tool that enables users to manage, inspect, and control how their requests are interpreted and executed by the system in real time. Upon accessing the application integrated with the SDK, a user may input a natural language request through the UI. Once the request is received and processed, the system generates an action plan using the first LLM, and this action plan is immediately displayed to the user in a structured, human-readable format. This may include a breakdown of API calls, filters applied, data join operations, and conditional logic derived from the user's input.

The UI further illustrates how the action plan is being executed. This includes step-wise progress indicators, execution logs, and visual feedback that reflects real-time interaction with backend systems and APIs. As the system executes each step—such as fetching data, filtering results, or joining datasets—the interface may dynamically update to show the output at each intermediate stage. This transparency allows users to understand how their request is operationalized behind the scenes.

If the user identifies an inconsistency, unexpected behavior, or a logical issue in the plan or during its execution, they are empowered to halt the execution through a visible control element (e.g., a "Stop Execution" button). This allows users to prevent incorrect operations or unintended API interactions, providing a critical layer of control and trust. Additionally, the interface allows for the submission of feedback related to any part of the execution. This feedback may be submitted during execution—triggering partial adjustments—or after execution, in which case it is logged and used to update the output or improve future responses from the system.

Upon successful completion of the validated and user-approved execution path, the final output is displayed to the user in the same interactive interface. The output may include raw data, visual summaries, tabular views, or export options, depending on the nature of the query and the host application's features. In all cases, the UI ensures that the information is not only accurate and complete but also presented in a way that aligns with the application's visual standards.

Unlike conventional dashboards or generic output viewers, the SDK is designed to integrate seamlessly into multiple applications, each with its own use case, layout, color scheme, font preferences, and interaction models. Once integrated into an application, the SDK automatically adapts to the host application's theme by inheriting its styles, UI components, and interaction paradigms. This ensures a native user experience while embedding advanced functionality. The interface leverages visual cues—such as stepwise execution indicators, collapsible logic trees, color-coded alerts, and interactive plan previews—to reflect ongoing system actions and to empower users to intervene, understand, and optimize their workflows in real time.

This design represents a concrete technological improvement over prior art by transforming opaque backend logic into interactive, understandable, and user-controllable plans. The GUI, in combination with backend LLM processing and secure execution workflows, forms a tightly integrated system that enables human-in-the-loop orchestration of complex multi-API operations—bridging the gap between natural language and system-level execution with precision, transparency, and control.

Once the action plan is verified and optionally augmented, the system proceeds to execute the plan by interfacing with the backend systems of the application, which include a combination of internal APIs, microservices, and enterprise databases. Each step of the action plan corresponds to a discrete operation such as invoking a REST API, performing a database query, filtering retrieved datasets, joining tables from different sources, or executing parallelized fetch operations (scatter-gather). These steps are orchestrated in sequence or asynchronously, depending on the structure and dependencies encoded in the plan.

The execution engine operates within a runtime environment—often a secure sandbox or private cloud infrastructure—where it translates each step in the action plan into low-level executable instructions such as HTTPS API requests, SQL commands, or RPC calls. Authentication, authorization, rate limiting, error retries, and data encryption protocols are automatically enforced at runtime. The execution engine also manages caching, throttling, and data validation to ensure that the system adheres to operational, security, and compliance standards.

From a technical perspective, the orchestration of backend systems, APIs, and databases based on a dynamically generated, context-aware action plan is not practically performable by a human. This is because:

- The action plan may involve hundreds of conditional and sequential operations that must be executed precisely and in the correct order;
- API endpoints may require real-time credential management, token refreshes, and header configurations that are opaque to a typical end user;
- Backend systems often respond with machine-readable payloads (e.g., JSON, XML) that require programmatic parsing, transformation, and combination across services and data sources;
- Scatter-gather operations involve simultaneous, parallel API calls and data synchronization, which cannot be reliably performed manually;
- Execution requires adherence to time-sensitive rate limits, error-recovery protocols, and schema transformations that must be applied within milliseconds-well beyond human capability.

Thus, the system provides a specific, concrete technological solution to a problem rooted in the complexity of interacting with distributed computing systems-namely, translating natural language into verified, executable logic and orchestrating it across heterogeneous backends.

Traditional execution pipelines typically lack contextual awareness of data sensitivity. They treat all data inputs uniformly, executing workflows without discerning whether the data contains confidential information, personally identifiable details, or sensitive business logic. This creates compliance and security risks, especially in enterprise environments where certain data must remain on-premise due to regulatory, contractual, or organizational policies. These conventional systems require manual rule-based routing or administrator intervention, which is error-prone and lacks adaptability when new data types or policies are introduced.

In contrast, the present system leverages a fine-tuned large language model (LLM) to automatically detect the confidentiality level of data by analyzing the content, metadata, and context of the user request. The LLM interprets whether the requested data falls under general access or requires enhanced safeguards, such as internal payroll, performance reviews, or protected health information. Based on this classification, the system determines the appropriate execution environment—either a secure cloud runtime or a controlled on-premise environment. This decision is embedded as part of the action plan generation or augmentation process, ensuring that sensitive workflows are rerouted automatically without user intervention. The result is a dynamic, intelligent data safeguarding mechanism that enforces execution locality based on real-time contextual understanding, offering stronger privacy compliance and operational security.

In some embodiments, the system may include a fallback and error recovery mechanism to ensure reliable execution of the action plan, even in the presence of transient failures, incomplete data, or downstream service unavailability. During execution, if an API call within the action plan fails—due to a timeout, incorrect parameters, rate limiting, or an unavailable endpoint—the system may automatically trigger a retry mechanism with exponential backoff. If retries continue to fail, the system may either log the error for user feedback or proceed to the next executable step, depending on whether the failed operation was marked as critical or optional in the plan metadata.

For instance, consider a user request: "Show all employees in the Bangalore office along with their performance rating and recent customer feedback." The action plan may include three key API calls:

(1) GET/employees?location=Bangalore
(2) GET/performance?employee_ids=[ . . . ]
(3) GET/feedback?employee_ids=[ . . . ]

If the feedback service (API 3) becomes temporarily unreachable, the system may retry the call multiple times. If the retries fail and the action plan metadata specifies that customer feedback is non-critical, the system proceeds with the remaining results-displaying employee details and performance ratings while gracefully excluding the feedback data. The UI may include a visual indicator such as a warning icon or message stating: "Customer feedback could not be retrieved at this time." This approach ensures partial completion of the request and avoids complete failure, thereby improving system resilience and user trust.

In some embodiments, the system may support multi-turn request handling by maintaining session context across a series of user interactions. This enables the system to interpret follow-up requests based on previous queries, without requiring the user to repeat the entire instruction. The SDK may associate each session with a context object that includes prior action plans, user-selected parameters, intermediate outputs, and inferred entities. This session context is passed to the first LLM during the generation of subsequent action plans, allowing the LLM to interpret phrases such as "only from last quarter," "now sort by rating," or "exclude interns" as modifications to the previous plan rather than standalone instructions.

For example, a user may begin a session with the request:

"Show me all employees in the Marketing department who received bonuses greater than $5,000 in the last 2 years."

The system generates and executes an action plan accordingly, returning a list of qualifying employees. The user may then follow up with:

"Now show only those based in Mumbai."

Rather than treating this as a new, unrelated query, the SDK references the previous action plan and injects the new condition (location=Mumbai) into the existing filter logic. The updated action plan is generated by the first LLM with the original bonus and department conditions retained, and the new location filter appended. The result is a refined dataset that accurately reflects the user's evolving intent across multiple turns.

This capability offers a more natural, conversational interface and significantly improves usability, especially for complex analytical or reporting tasks where users often explore and refine their queries iteratively. It also reinforces the system's ability to act as a true "copilot" for enterprise users.

In some embodiments, the system may support execution resilience in the presence of versioned APIs and schema drift by dynamically adapting the action plan to align with the most current and valid API specifications. API versioning and backend schema evolution are common in large-scale enterprise environments, where endpoints may be deprecated, renamed, or updated to require different parameters or response structures. To address this, the SDK may maintain a version-aware API registry that tracks the availability, parameter expectations, and response schemas of various documented and undocumented APIs. During action plan generation, the first LLM may be prompted with metadata indicating which API versions are active, deprecated, or preferred. If an action plan references an outdated or deprecated endpoint, the second LLM may identify the mismatch and automatically substitute the correct version or adjust the plan accordingly.

For example, consider a user request:

"Get me the list of all employees who joined after 2022 and have completed onboarding."

The original action plan may attempt to call an endpoint such as:

GET /v1/employees?start_date>2022-01-01&onboarding_status=completed

If /v1/employees has been deprecated and replaced with/v2/employees-which now expects joined_after instead of start_date—the second LLM, upon validation, may detect that the current call does not conform to the latest schema. It updates the action plan to use:

GET /v2/employees?joined_after=2022-01-01&onboarding_status=completed

This dynamic handling of API versioning ensures backward compatibility and forward adaptability of action plans without requiring user intervention or manual updates to the SDK. It improves system robustness, reduces execution failures due to outdated references, and minimizes developer overhead when backend systems evolve.

In some embodiments, the system may include a comprehensive auditability and logging framework that captures the full lifecycle of each user request, from initial input to final execution and feedback. Each action plan, whether successfully executed or halted, is logged along with associated metadata such as timestamps, user identity, session context, API call sequences, verification steps by the second LLM, data sensitivity flags, and final outputs. These logs may be securely stored in an encrypted, access-controlled audit trail, and may be queryable via administrative interfaces for post-hoc analysis, compliance reporting, or debugging.

For example, when a user submits a request such as "List all employees promoted in the last year with salary increases above 10%," the system logs:

The original natural language input,

The action plan generated by the first LLM,

Corrections made by the second LLM (e.g., mapping "last year" to a specific date range), The selected execution environment (e.g., secure cloud vs. on-prem), All API responses and step-wise outputs, and Any feedback submitted by the user after viewing the results.

This level of traceability ensures transparency and accountability in high-stakes domains such as HR, finance, or healthcare, where regulatory requirements may demand proof of how data was accessed, filtered, and used. Additionally, these logs serve as a valuable data source for retraining the LLMs, improving future performance based on real-world interactions without compromising user privacy. The audit framework forms a core part of the system's operational integrity and supports both internal governance and external compliance obligations (e.g., SOC 2, HIPAA, GDPR).

Figure 2:
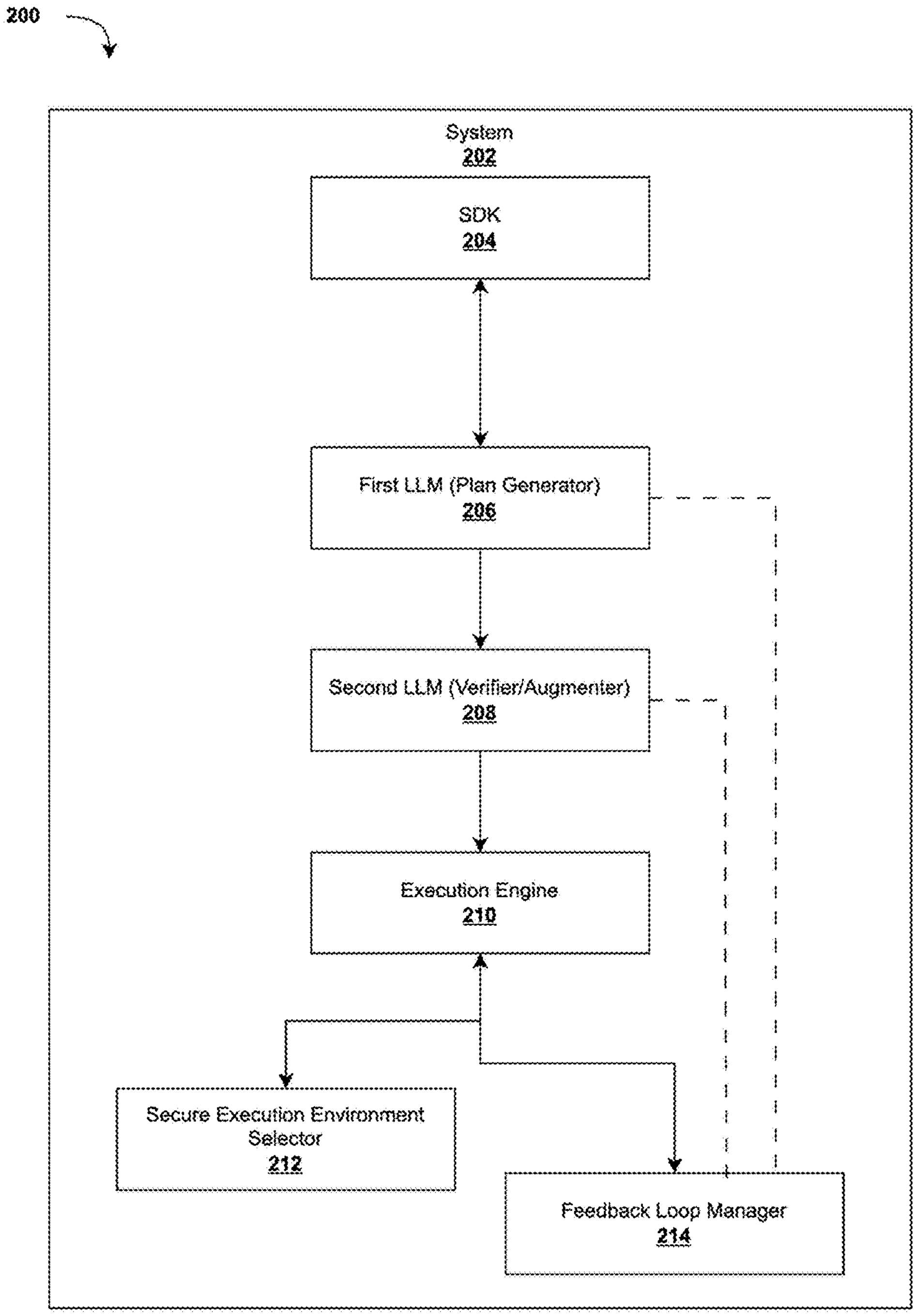
FIG. 2 illustrates a system architecture for API-driven action plan generation and execution, showing the interconnected modules including an SDK, first and second LLMs, execution engine, environment selector, and feedback loop manager.

Referring to FIG. 2, a system architecture 200 is illustrated that shows the interconnected components for processing and executing user requests. The system architecture 200 comprises a system module 202 that contains a software development kit (SDK) 204 positioned at the top level of the hierarchy. The SDK 204 interfaces with other components and maintains bidirectional communication with a plan generator module 206, which houses the first LLM responsible for generating action plans from user requests.

The plan generator module 206 connects to a verification module 208 containing the second LLM that serves as a verifier and augmenter for the generated action plans. The verification module 208 processes output from the plan generator module 206 and feeds validated plans into an execution module 210. The execution module 210 handles the implementation of processed plans and maintains bidirectional communication with an environment selector module 212, which determines the appropriate secure execution environment based on data sensitivity analysis.

A feedback module 214 receives input from the execution module 210 and maintains feedback connections back to both the plan generator module 206 and verification module 208, as indicated by dashed lines. This feedback loop enables continuous learning and improvement of both LLMs based on execution outcomes and user modifications.

Figure 3:
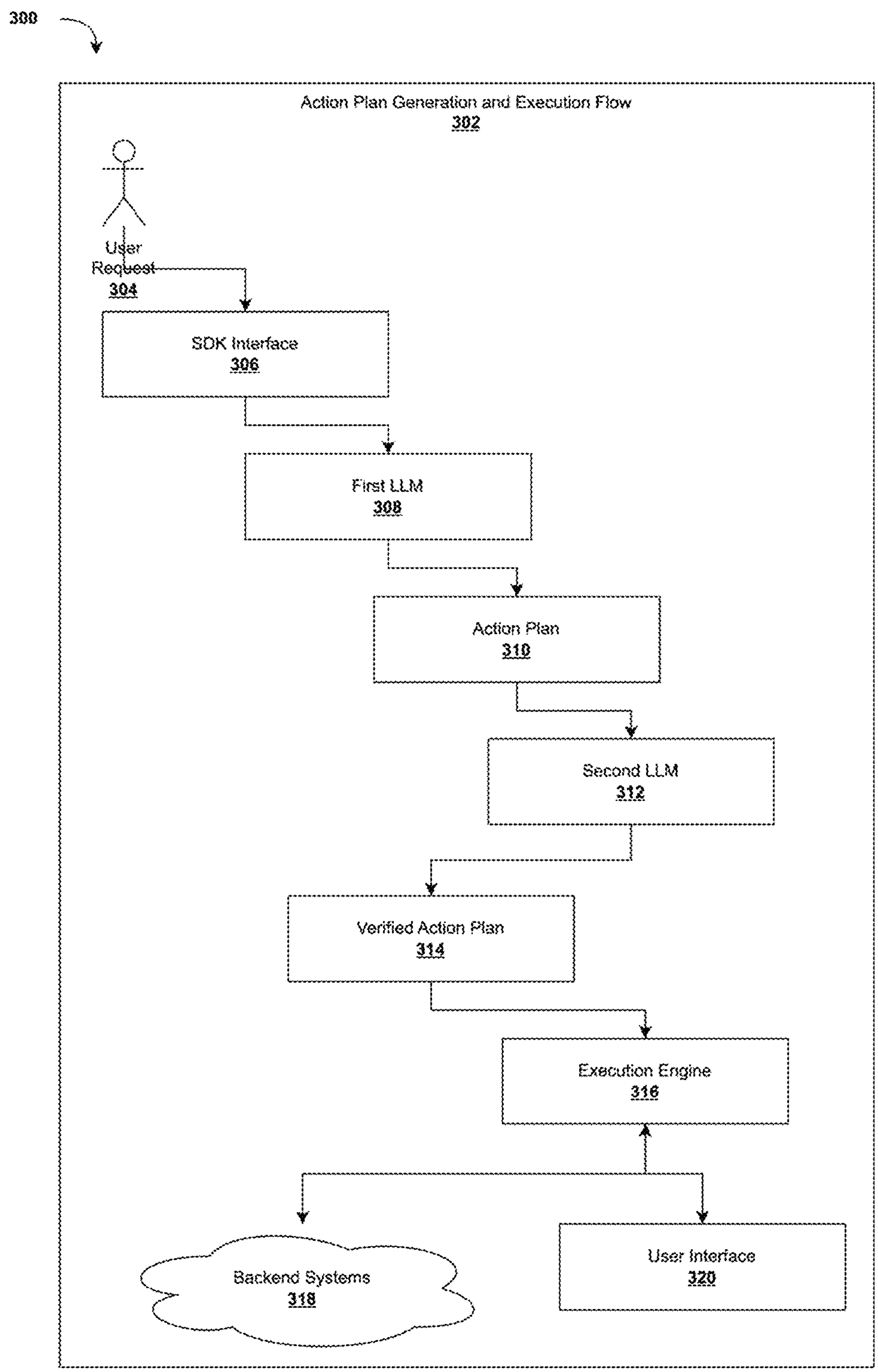
FIG. 3 depicts a flowchart of the action plan generation and execution process, from user request input through SDK interface processing, LLM-based plan generation and verification, to final execution via backend systems and user interface.

Referring to FIG. 3, a process 300 illustrates the action plan flow 302 from initial user input through execution. The process begins with a user request at step 304, which is received by an SDK interface at step 306. The user request flows to a first LLM at step 308, which processes the input and generates an action plan at step 310. The action plan is then passed to a second LLM at step 312 for verification and augmentation, producing a verified action plan at step 314. An execution engine at step 316 receives the verified plan and interfaces with both backend systems at step 318, represented by a cloud shape indicating distributed systems, and a user interface at step 320 for presenting results and enabling user interaction.

Figure 4:
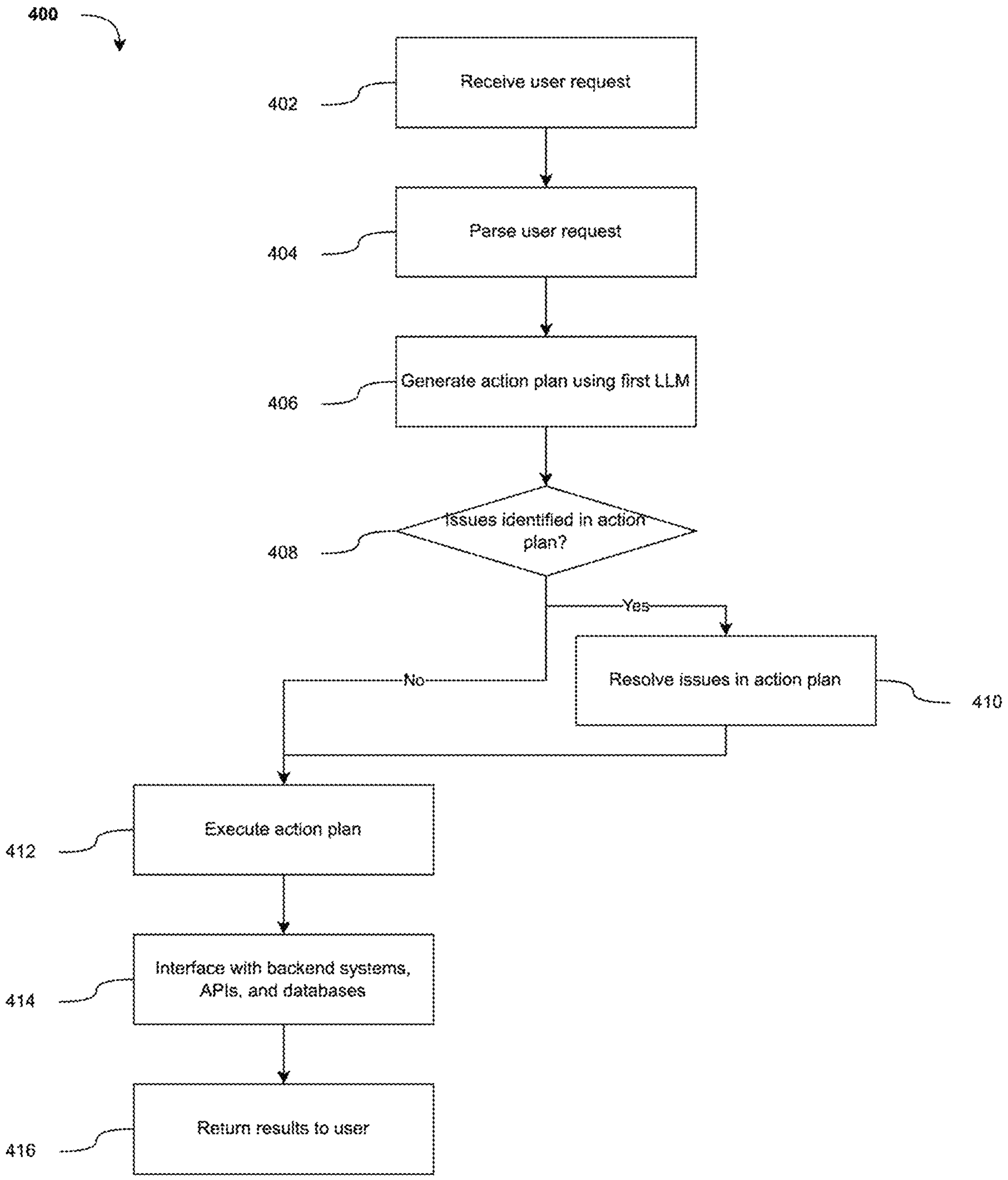
FIG. 4 shows a method for processing user requests, including steps for receiving and parsing user input, generating action plans using a first LLM, identifying and resolving issues, executing the plan, and interfacing with backend systems to return results.

Referring to FIG. 4, a method 400 depicts the complete process flow for handling user requests. The method begins at step 402 with receiving a user request, followed by parsing the user request at step 404. At step 406, an action plan is generated using the first LLM. A decision point at step 408 determines if issues are identified in the action plan. If issues are found, the method proceeds to step 410 to resolve the identified issues. If no issues are detected, or after resolution, the method continues to step 412 where the action plan is executed. The method then interfaces with backend systems, APIs, and databases at step 414, and concludes by returning results to the user at step 416.

Figure 5:
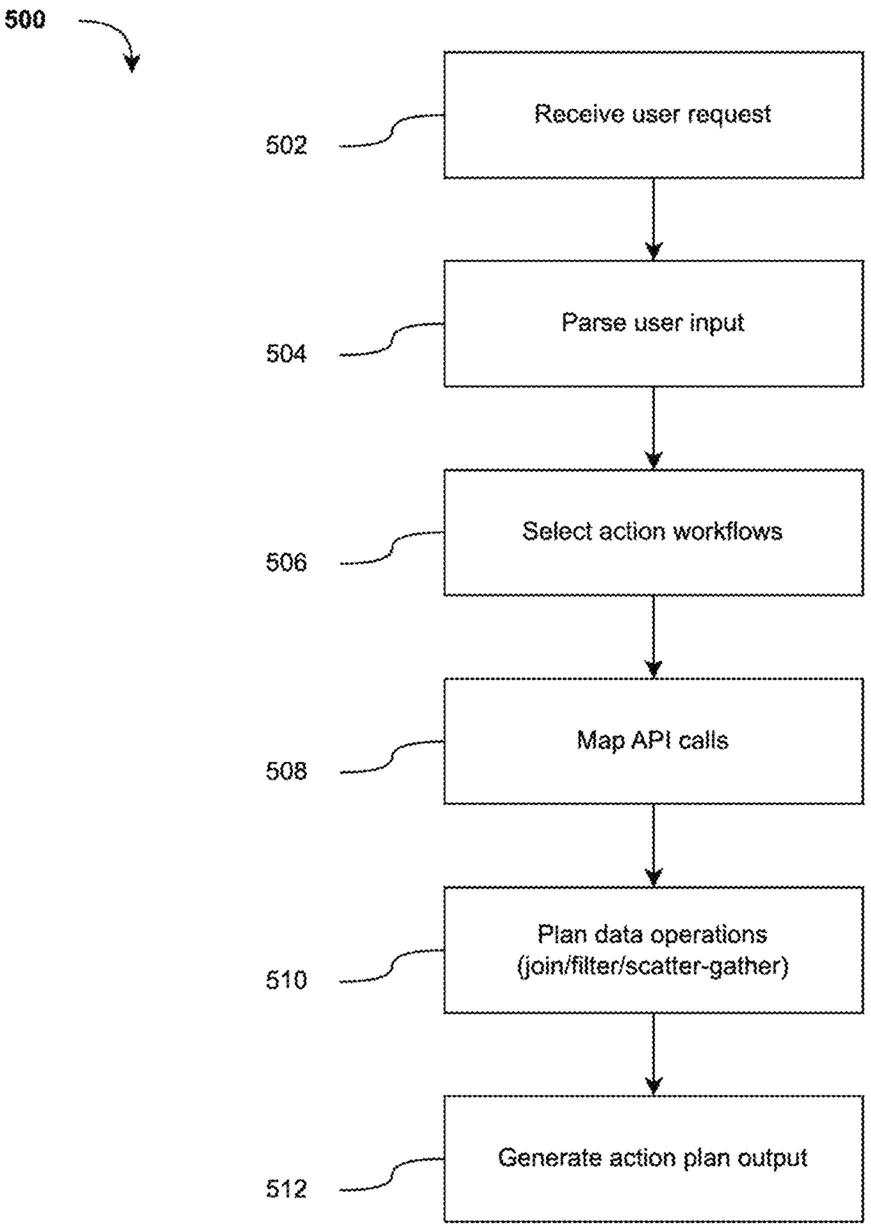
FIG. 5 illustrates a method for action plan generation, detailing the sequential steps of receiving user requests, parsing input, selecting action workflows, mapping API calls, planning data operations, and generating the final action plan output.

Referring to FIG. 5, a method 500 illustrates the detailed process of action plan generation. The method begins with receiving a user request at step 502, followed by parsing the user input at step 504. At step 506, appropriate action workflows are selected based on the parsed input. The method then maps API calls at step 508 and plans data operations including join, filter, and scatter-gather operations at step 510. The method concludes with generating an action plan output at step 512.

Figure 6:
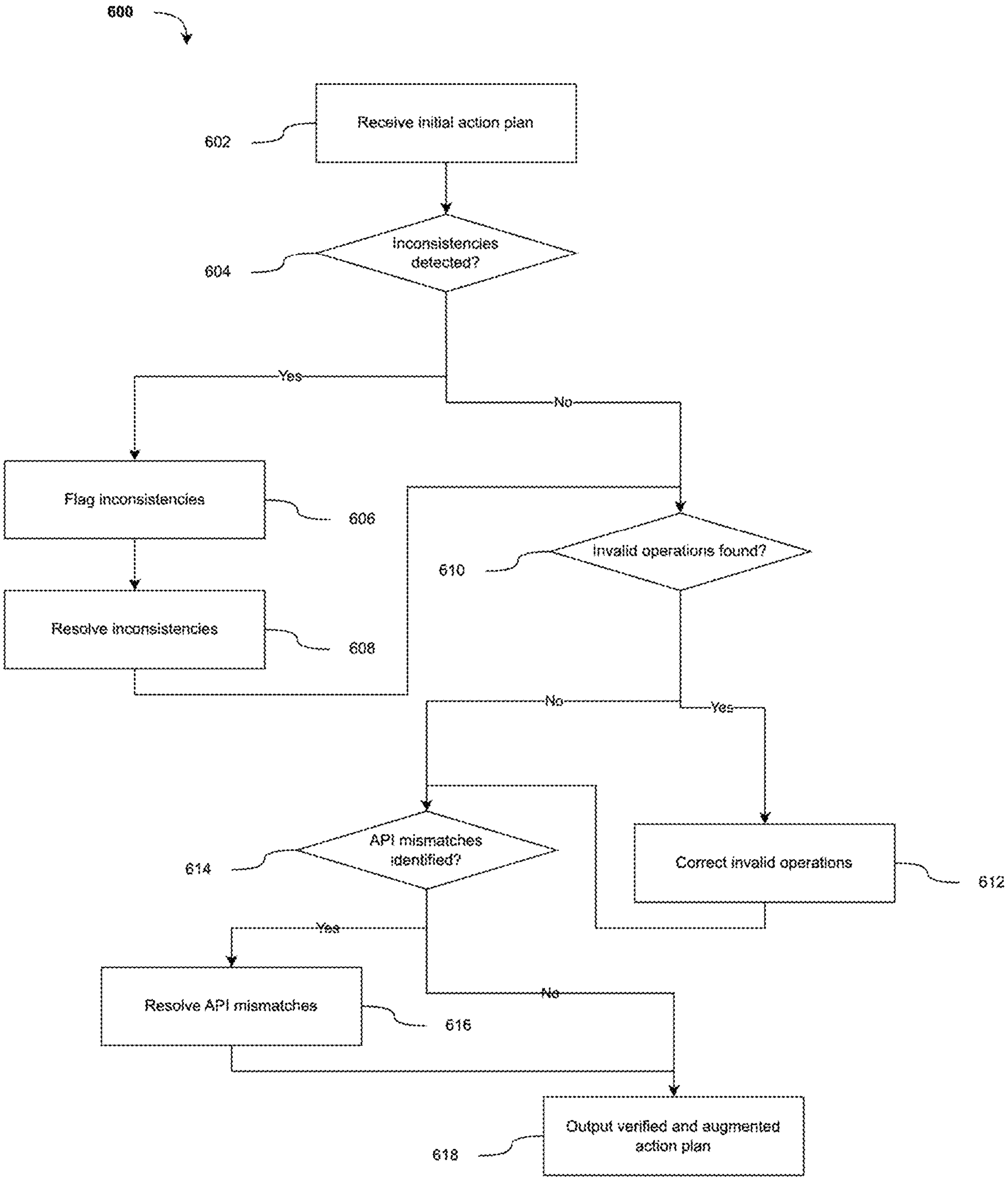
FIG. 6 depicts a verification and augmentation method for action plans, showing the process of detecting and resolving inconsistencies, invalid operations, and API mismatches to produce a verified and augmented action plan.

Referring to FIG. 6, a method 600 shows the verification and validation process for action plans. The method begins by receiving an initial action plan at step 602. At step 604, the system checks for inconsistencies, and if detected, flags them at step 606 and resolves them at step 608. The method then checks for invalid operations at step 610, correcting any found issues at step 612. At step 614, the system checks for API mismatches, resolving any identified mismatches at step 616. The method concludes by outputting a verified and augmented action plan at step 618.

Figure 7:
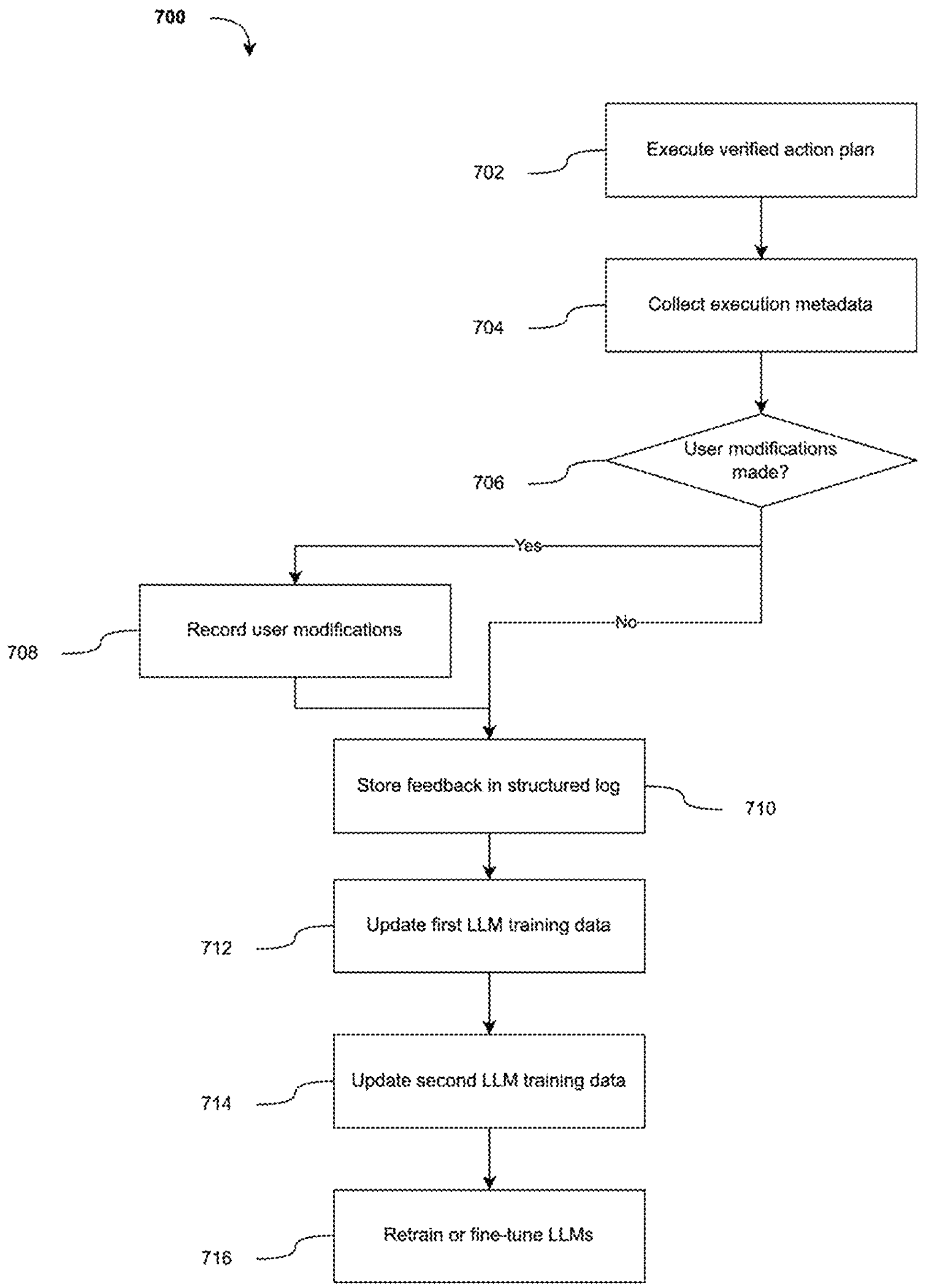
FIG. 7 shows a method for continuous learning and model improvement, including steps for executing verified action plans, collecting metadata, recording user modifications, storing feedback, and updating training data for both LLMs.

Referring to FIG. 7, a method 700 illustrates the feedback and training update process. The method begins with executing a verified action plan at step 702, followed by collecting execution metadata at step 704. At step 706, the system determines if user modifications were made. If modifications occurred, they are recorded at step 708. The method then stores feedback in a structured log at step 710, updates the first LLM training data at step 712, updates the second LLM training data at step 714, and concludes by retraining or fine-tuning the LLMs based on the collected data and feedback at step 716.

Some embodiments of the system and the method enable automatic transformation of natural language user requests into structured, multi-step action plans without requiring manual scripting or pre-defined workflows.

Some embodiments of the system and the method allow for intelligent differentiation between confidential and general data, enabling secure routing of execution to on-premise or cloud environments based on real-time sensitivity analysis.

Some embodiments of the system and the method support scalable orchestration across large, heterogeneous API ecosystems—including both documented and undocumented APIs—without the need for hardcoded logic.

Some embodiments of the system and the method provide real-time verification and augmentation of action plans using a second language model, thereby reducing execution errors and improving compliance with application-specific rules and policies.

Some embodiments of the system and the method offer users transparency and control by previewing the generated action plan before execution and enabling live monitoring, interruption, and feedback mechanisms.

Some embodiments of the system and the method adapt the SDK interface dynamically to the host application's layout, color scheme, and typography, ensuring seamless UI integration across diverse environments.

Some embodiments of the system and the method support advanced data handling operations such as joins, filters, and scatter-gather execution, enabling complex analytics and multi-entity workflows to be fulfilled via a single user request.

Some embodiments of the system and the method incorporate continuous learning by collecting execution feedback and user corrections to fine-tune both language models, thereby improving future plan accuracy and reducing system reliance on human intervention.

A number of implementations have been described. Nevertheless, it will be understood that various modifications may be made without departing from the spirit and scope of the disclosure. Accordingly, other implementations are within the scope of the following claims.

The invention claimed is:

1. A system, comprising:

a device having a memory and a processor running an application; and a software development kit (SDK) integrated with the application, the SDK being stored in the memory and executed by the processor, wherein the SDK interacts with one or more Application Programming Interfaces (APIs) of the application, wherein the SDK is configured to:

receive a user request to execute two or more operations in the application;

generate, by a first Large Language Model (LLM), an action plan comprising a sequence of performing one or more action workflows selected from a set of pre-defined action workflows, one or more API calls selected from the one or more APIs, and one or more data handling operations comprising one or more of join, filter, and scatter-gather, wherein the first LLM is fine-tuned based on pre-defined action workflows of the application and an application specification comprising a set of documented APIs and a set of undocumented APIs; and execute the action plan on the application in real-time when no issues are identified in the action plan, wherein the action plan is executed by interfacing with backend systems of the application, the one or more APIs of the application, and databases.

2. The system of claim 1, wherein an action workflow of the one or more action workflows maps the one or more APIs to a set of operations associated with the application, wherein the one or more APIs comprises the set of documented APIs and the set of undocumented APIs.

3. The system of claim 1, wherein fine tuning the first Large Language Model (LLM) to generate action plans involves:

training the first LLM based on the set of pre-defined action workflows, and the application specification;

providing the first LLM with domain-specific language examples for data handling operations comprising scatter-gather, join, and filter, to guide the generation of valid API calls;

fine-tuning the first LLM to map user requests to API calls and operations based on the set of pre-defined action workflows and application data;

utilizing labeled examples to optimize the first LLM's ability to generate accurate action plans;

continuously improving the first LLM through feedback to enhance performance in handling diverse action requests.

4. The system of claim 1, wherein the application has a set of APIs, stored in the memory, associated with one or more of a compliance norm or domain specific rules.

5. The system of claim 4, further comprising utilizing a second LLM model to verify correctness of the generated action plan by identifying at least one of an inconsistency, invalid operation, or API mismatch based on the one or more of a compliance norm or the domain specific rules.

6. The system of claim 5, wherein the second LLM is configured to:

flag at least one of the inconsistency, the invalid operation, or the API mismatch in the action plan; and augment the action plan by resolving at least one of the inconsistency, the invalid operation, or the API mismatch identified during verification.

7. The system of claim 6, further comprising training the first LLM based on feedback from the second LLM regarding the flagged at least one of the inconsistencies, the invalid operations, or the API mismatches to improve accuracy of future action plans.

8. The system of claim 5, wherein the second Large Language Model (LLM) is trained based on user-modified action plans, wherein user modifications include manual adjustments or debugging actions made to correct inconsistencies, invalid operations, or API mismatches.

9. The system of claim 8, wherein the second LLM is further trained using reinforcement learning, comprising providing rewards for correct modifications suggested by the second LLM model and penalties for incorrect modifications, thereby iteratively improving accuracy of the second LLM in detecting and resolving issues in the action plan.

10. The system of claim 1, wherein the application specification and application data associated with the application are stored in the memory.

11. The system of claim 1, wherein the set of undocumented APIs are accessible through backend communications.

12. The system of claim 1, wherein a user is provided with a set of predefined modification options, including filtering criteria adjustments, data selection, and step reordering, to allow customization of the action plan, wherein the action plan further comprising LLM-powered analysis and input reasoning.

13. The system of claim 1, wherein the execution of the action plan occurs within an isolated environment, where user data is encrypted during transmission and storage to maintain privacy.

14. A method comprising:

receive a user request to execute two or more operations in an application, wherein the application is executed by a processor of a device having a memory;

generate, by a first Large Language Model (LLM), an action plan comprising a sequence of performing one or more action workflows selected from a set of pre-defined action workflows, one or more Application Programming Interface (API) calls selected from one or more APIs, and one or more data handling operations comprising one or more of join, filter, and scatter-gather, wherein the first LLM is fine-tuned based on the set of pre-defined action workflows of the application and an application specification comprising a set of documented APIs and a set of undocumented APIs; and execute the action plan on the application in real-time when no issues are identified in the action plan, wherein the action plan is executed by interfacing with backend systems of the application, the one or more APIs of the application, and databases.

15. The method of claim 14, wherein an action workflow of the one or more action workflows maps the one or more APIs to a set of operations associated with the application, wherein the one or more APIs comprises the set of documented APIs and the undocumented APIs.

16. The method of claim 14, wherein fine tuning the first Large Language Model (LLM) to generate action plans involves:

training the first LLM based on the set of pre-defined action workflows, and the application specification;

providing the first LLM with domain-specific language examples for data handling operations comprising scatter-gather, join, and filter, to guide the generation of valid API calls;

fine-tuning the first LLM to map user requests to API calls and operations based on the set of pre-defined action workflows and application data;

utilizing labeled examples to optimize the first LLM's ability to generate accurate action plans;

continuously improving the first LLM through feedback to enhance performance in handling diverse action requests.

17. The method of claim 14, wherein the application has a set of APIs, stored in the memory, associated with one or more of a compliance norm or domain specific rules.

18. The method of claim 14 further comprising utilizing a second LLM model to verify correctness of the generated action plan by identifying at least one of an inconsistency, invalid operation, or API mismatch based on the one or more of a compliance norm or the domain specific rules.

19. The method of claim 18, wherein the second LLM is configured to:

flag at least one of the inconsistency, the invalid operation, or the API mismatch in the action plan; and augment the action plan by resolving at least one of the inconsistency, the invalid operation, or the API mismatch identified during verification.

20. The method of claim 19, further comprising training the first LLM based on feedback from the second LLM regarding the flagged at least one of the inconsistencies, the invalid operations, or the API mismatches to improve accuracy of future action plans generated by the first LLM.

* * * * *